(12) United States Patent
Sainani et al.

(10) Patent No.: US 12,198,021 B2
(45) Date of Patent: Jan. 14, 2025

(54) AUTOMATIC GENERATION OF DATA ANALYSIS QUERIES

(71) Applicant: Splunk Inc., San Francisco, CA (US)

(72) Inventors: Manish Sainani, Kirkland, WA (US); Sergey Slepian, Vancouver (CA); Iman Makaremi, North Vancouver (CA); Adam Jamison Oliner, San Francisco, CA (US); Jacob Leverich, San Francisco, CA (US); Di Lu, Vancouver (CA)

(73) Assignee: Cisco Technology, Inc, San Jose, CA (US)

( * ) Notice: Subject to any disclaimer, the term of this patent is extended or adjusted under 35 U.S.C. 154(b) by 526 days.

(21) Appl. No.: 17/190,751

(22) Filed: Mar. 3, 2021

(65) Prior Publication Data

US 2021/0192395 A1    Jun. 24, 2021

Related U.S. Application Data

(63) Continuation of application No. 16/707,845, filed on Dec. 9, 2019, now Pat. No. 10,956,834, which is a continuation of application No. 15/050,785, filed on Feb. 23, 2016, now Pat. No. 10,607,150.

(51) Int. Cl.
| | |
|---|---|
| *G06N 20/00* | (2019.01) |
| *G06N 5/025* | (2023.01) |
| *H04L 41/00* | (2022.01) |
| *H04L 41/16* | (2022.01) |
| *H04L 41/22* | (2022.01) |

(52) U.S. Cl.
CPC ............. *G06N 20/00* (2019.01); *G06N 5/025* (2013.01); *H04L 41/16* (2013.01); *H04L 41/20* (2013.01); *H04L 41/22* (2013.01)

(58) Field of Classification Search
CPC ........ G06N 20/00; G06N 5/025; H04L 41/16; H04L 41/20; H04L 41/22
See application file for complete search history.

(56) References Cited

U.S. PATENT DOCUMENTS

| | | | |
|---|---|---|---|
| 10,607,150 B2 | 3/2020 | Sainani et al. | |
| 10,679,142 B2 | 6/2020 | Ganapathi | |
| 2005/0131847 A1* | 6/2005 | Weston | G06F 18/2411 706/12 |

(Continued)

OTHER PUBLICATIONS

Ribeiro et al., "MLaaS: Machine Learning as a Service", 2015, 2015 IEEE 14th International Conference on Machine Learning and Applications, pp. 896-902. (Year: 2015).*

(Continued)

*Primary Examiner* — Brent Johnston Hoover
(74) *Attorney, Agent, or Firm* — Perkins Coie LLP

(57) ABSTRACT

Disclosed herein is a computer-implemented tool that facilitates data analysis by use of machine learning (ML) techniques. The tool cooperates with a data intake and query system and provides a graphical user interface (GUI) that enables a user to train and apply a variety of different ML models on user-selected datasets of stored machine data. The tool can provide active guidance to the user, to help the user choose data analysis paths that are likely to produce useful results and to avoid data analysis paths that are less likely to produce useful results.

19 Claims, 20 Drawing Sheets

(56) References Cited

U.S. PATENT DOCUMENTS

| | | | |
|---|---|---|---|
| 2007/0094360 A1 | 4/2007 | Forlenza et al. | |
| 2007/0260597 A1 | 11/2007 | Cramer | |
| 2014/0074850 A1 | 3/2014 | Noel et al. | |
| 2014/0358825 A1* | 12/2014 | Phillipps | G06N 20/20 706/11 |
| 2014/0372346 A1* | 12/2014 | Phillipps | G06N 20/00 706/12 |
| 2015/0039651 A1* | 2/2015 | Kinsely | G06F 16/254 707/779 |
| 2016/0162803 A1 | 6/2016 | Amershi et al. | |
| 2016/0358101 A1* | 12/2016 | Bowers | G06N 20/00 |
| 2017/0124487 A1* | 5/2017 | Szeto | G06F 11/1448 |
| 2017/0193333 A1 | 7/2017 | Cavalin et al. | |
| 2017/0199875 A1 | 7/2017 | Nevrekar et al. | |
| 2020/0118030 A1 | 4/2020 | Sainani et al. | |

OTHER PUBLICATIONS

Alspaugh, Sara, et al., "Analyzing Log Analysis: An Empirical Study of User Log Mining", 28th Large Installation System Administration Conference (LISA14), Nov. 9-14, 2014, 17 pages.

Alspaugh, Sara, et al., "Towards a Data Analysis Recommendation System", Presented as part of the 2012 Workshop on Managing Systems Automatically and Dynamically, Oct. 2012, 6 pages.

Asplaugh, S., "Data analysis interaction record analysis methodology", GiHub, Inc. [website] [retrived on Jun. 3, 2016], retrieved from: https://gihub.com/salspaugh/lupe/wiki/Data-analysis-interaction-record-analysis-methodology, Nov. 24, 2014, 6 pages.

Bermudez-Chacon, Roger, et al., "Automatic problem-specific hyperparameter optimization and model selection for supervised machine learning", ETH Zurich Research Collection; Technical Report, 2015, pp. 1-53.

Chau, Michael, et al., "Analysis of the Query Logs of a Web Site Search Engine", Journal of the American Society for Information Science and Technology: 56(13), 2005, pp. 1363-1376.

Dreilinger, Daniel, et al., "Experiences with Selecting Search Engines Using Metasearch", ACM Transactions on Information Systems (TOIS) 15.3, Jul. 1997, pp. 195-222.

Garner, Stephen R., "WEKA: The Waikato Environment for Knowledge Analysis", Proceedings of the New Zealand Computer Science Research Students Conference, 1995, pp. 57-64.

Pirolli, Peter, et al., "The Effects of Information Scent on Visual Search in the Hyperbolic Tree Browser", ACM Transactions on Computer-Human Interaction (TOCHI) 10.1, Mar. 2003, pp. 20-53.

Siddiqi, Sajid, et al., "Fast State Discovery for HMM Model Selection and Learning", Artificial Intelligence and Statistics, Mar. 2007, 8 pages.

Spiliopoulou, Myra, et al., "NOEMON: An Intelligent Assistant for Classifier Selection", FGML 1998, No. 11 in 98, Dept. of Computer Science, TU Berlin, 1998, pp. 90-97.

Talbot, Justin, et al., "EnsembleMatrix: Interactive Visualization to Support Machine Learning with Multiple Classifiers", CHI 2009 ~ Visualization 2, Apr. 8, 2009, pp. 1283-1292.

\* cited by examiner

FIG. 12A

| Analysis Type | Example Query Template | Example Final Query |
|---|---|---|
| Fit (Train) Model | \| loadjob $dataLoaderJobIdToken$ \| search partitionKey__ = 0 \| fields - randomKey__ partitionKey__ \| fit LinearRegression into $modelNameToken$ \| $regressionTargetToken$ from $regressionFeaturesToken$` | \| loadjob $dataLoaderJobIdToken$ \| search partitionKey__ = 0 \| fields - randomKey__ partitionKey__ \| fit LinearRegression into example_app_usage "RemoteAccess" from "CRM" "CloudDrive" "HR1" "Webmail" |
| Apply Model | \| loadjob $dataLoaderJobIdToken$ \| apply "example_app_usage" | \| inputlookup apps.csv\| apply "example_app_usage" |
| Summary Model | \| summary $modelNameToken$ \| table * \| fields feature coefficient \| rename feature as \"Prediction Feature\"\| rename coefficient as \"Linear Regression Coefficient\" | \| summary "example_app_usage" \| table * \| fields feature coefficient \| rename feature as "Prediction Feature" \| rename coefficient as "Linear Regression Coefficient" |
| Actual vs. Predict Scatter | \| loadjob $trainingJobIdToken$ \| table $regressionTargetToken$ $regressionPredictionToken$ \| rename $regressionTargetToken$ as actual \| rename $regressionPredictionToken$ as predicted | \| inputlookup apps.csv \| apply "example_app_usage" \| table "RemoteAccess" predicted(RemoteAccess) \| rename "RemoteAccess" as actual \| rename "predicted(RemoteAccess)" as predicted |
| Residual | \| loadjob $trainingJobIdToken$ \| eval residual = '$regressionTargetToken$' - '$regressionPredictionToken$' \| bin residual bins=100 \| stats count by residual \| makecontinuous residual \| fillnull \| rename count as "Sample Count"\| rename residual as "Residual Error" | \| inputlookup apps.csv \| apply "example_app_usage" \| eval residual = 'RemoteAccess' - 'predicted(RemoteAccess)' \| bin residual bins=100 \| stats count by residual \| makecontinuous residual \| fillnull \| rename count as "Sample Count" \| rename residual as "Residual Error" |

(cont'd FIG. 12B)

FIG. 12B
(cont'd from FIG. 12A)

| Analysis Type | Example Query Template | Example Final Query |
|---|---|---|
| R² Statistics | \|loadjob $trainingJobIdToken$ \| eventstats avg($regressionTargetToken$) as averageObservation_ \| eval observationMinusAverageObservation_ = '$regressionTargetToken$' - averageObservation_ \| eval predictionMinusAverageObservation_ = '$regressionPredictionToken$' - averageObservation_ \| stats sumsq(observationMinusAverageObservation_) as observationMinusAverageObservationSumSq_, sumsq(predictionMinusAverageObservation_) as predictionMinusAverageObservationSumSq_ \| eval result = predictionMinusAverageObservationSumSq_ / observationMinusAverageObservationSumSq_ \| eval result = \| fieldformat result = tostring(round(result * 10) / 10, \"commas\") | \|inputlookup apps.csv \| apply "example_app_usage" \| eventstats avg(RemoteAccess) as averageObservation_ \| eval observationMinusAverageObservation_ = 'RemoteAccess' - averageObservation_ \| eval predictionMinusAverageObservation_ = 'predicted(RemoteAccess)' - averageObservation_ \| stats sumsq(observationMinusAverageObservation_) as observationMinusAverageObservationSumSq_, sumsq(predictionMinusAverageObservation_) as predictionMinusAverageObservationSumSq_ \| eval result = predictionMinusAverageObservationSumSq_ / observationMinusAverageObservationSumSq_ \| fieldformat result = tostring(round(result * 10) / 10, "commas") |
| RMSE | \|loadjob $trainingJobIdToken$ \| eval residual_ = '$regressionTargetToken$' - '$regressionPredictionToken$' \| stats sumsq(residual_) as residualSumSq_, count(residual_) as sampleCount_ \| eval result = sqrt(residualSumSq_ / sampleCount_) \| fieldformat result = tostring(result, \"commas\") | \|inputlookup apps.csv \| apply "example_app_usage" \| eval residual_ = 'RemoteAccess' - 'predicted(RemoteAccess)' \| stats sumsq(residual_) as residualSumSq_, count(residual_) as sampleCount_ \| eval result = sqrt(residualSumSq_ / sampleCount_) \| fieldformat result = tostring(result, "commas") |

AUTOMATIC GENERATION OF DATA ANALYSIS QUERIES

This application is a continuation of U.S. patent application Ser. No. 16/707,845 filed on Dec. 9, 2019, which is a continuation of U.S. patent application Ser. No. 15/050,785 filed on Feb. 23, 2016, issued as U.S. Pat. No. 10,607,150, which are incorporated by reference herein in their entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

At least one embodiment of the present disclosure pertains to information organization and understanding, and more particularly, to the organization and understanding of machine data.

BACKGROUND

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data ("machine data"). In general, machine data can include performance data, diagnostic information and/or any of various other types of data indicative of performance or operation of equipment in a computing system. Such data can be analyzed to diagnose equipment performance problems, monitor user interactions, and to derive other insights.

A number of tools are available to analyze machine-generated data. In order to reduce the volume of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may, for example, enable an analyst to investigate different aspects of the machine data that previously were unavailable for analysis. However, analyzing and searching massive quantities of machine data presents a number of challenges.

BRIEF DESCRIPTION OF THE DRAWINGS

One or more embodiments of the present disclosure are illustrated by way of example and not limitation in the figures of the accompanying drawings, in which like references indicate similar elements.

FIGS. 12A and 12B collectively show a table including examples of query templates and corresponding final queries, for various types of analyses that the user can invoke.

DETAILED DESCRIPTION

Figure 1:
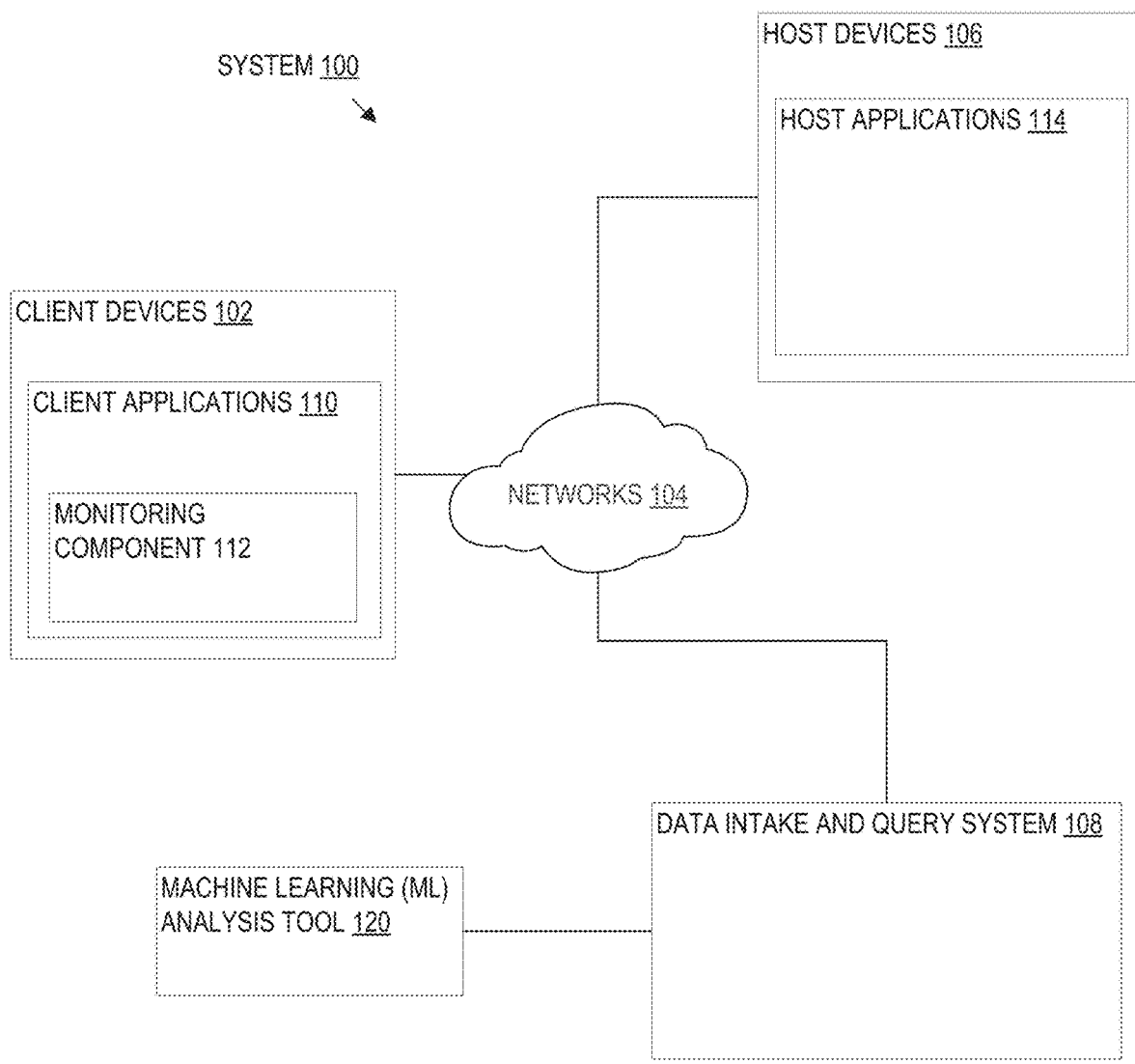
FIG. 1 illustrates a networked computer environment in which an embodiment may be implemented.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

The techniques introduced here include, among other things, a computer-implemented tool that facilitates data analysis by use of machine learning (ML) techniques. The tool in certain embodiments includes a browser-based software application that cooperates with a data intake and query system and provides a graphical user interface (GUI) that enables a user to train and apply a variety of different ML models on user-selected datasets of stored machine data. Note, however, that while the techniques introduced here are described in relation to searching and analyzing machine data, they also can be applied to facilitate search and analysis of many other kinds of data.

In some embodiments the tool provides a dashboard that includes images and corresponding labels representing various different types of ML analysis that the user can explore. The user can, for example, click on images or labels in the dashboard to explore the kinds of ML analytics that the tool 120 provides. The dashboard can include, for each type of analysis, end-to-end examples with sample datasets and the ability to apply the analysis to a dataset selected by the user. The user can inspect the dashboard panels and other code to see how each one works and then create custom dashboards to suit his or her needs. Examples of the types of ML analyses that the tool may provide include: prediction of numeric fields (e.g., linear regression), prediction of categorical fields (e.g., logistic regression), detection of numeric outliers (e.g., distribution statistics), detection of categorical outliers (e.g., probabilistic statistics), forecasting time series data, and cluster identification/analysis (e.g., K-means, DBSCAN, Spectral Clustering, BIRCH).

An advantageous feature of the tool is that it provides active guidance to the user, to help the user choose data analysis paths that are likely to produce useful results and to avoid data analysis paths that are less likely to produce useful results. For example, once the user selects a particular type of ML model to train and a training dataset from which to train it, the tool can suggest specific data fields from the training dataset that the user can select for training the model. Further, the tool can suggest specific fields from the training dataset that the user can select to be the output of the model.

Additionally, the tool can suggest to the user various types of additional analyses that the user can request, which the user can use to validate training of an ML model or the results applying a trained ML model to other data. To accomplish this, the tool can, as a background process, apply user-specified field selections and/or other user inputs to various predefined query templates, to produce multiple "prepackaged" queries. Each of the prepackaged queries is tailored to the user's selected dataset and corresponds to a different kind of validation analysis. The user can then select a control on the GUI (e.g., a hyperlink), corresponding to any of these analyses, to invoke the corresponding query and thereby cause a corresponding visualization (e.g., a graph) to be generated. The queries are "prepackaged" in the sense that they are generated in the absence of any specific user request to generate them, so that they are ready for the user to invoke if the user so desires. Among other benefits, preparing these tailored queries prior to any request for the analyses improves performance by reducing overall latency associated with model validation.

Various other features of the tool will become apparent from the description which follows. First, however, it is useful to consider an example of an environment and system in which the tool may be employed, as will now be described.

1.0. General Overview

Modern data centers and other computing environments can comprise anywhere from a few host computer systems to thousands of systems configured to process data, service requests from remote chants, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK®

ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources.

2.0 Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE. HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3, Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app," For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference herein in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
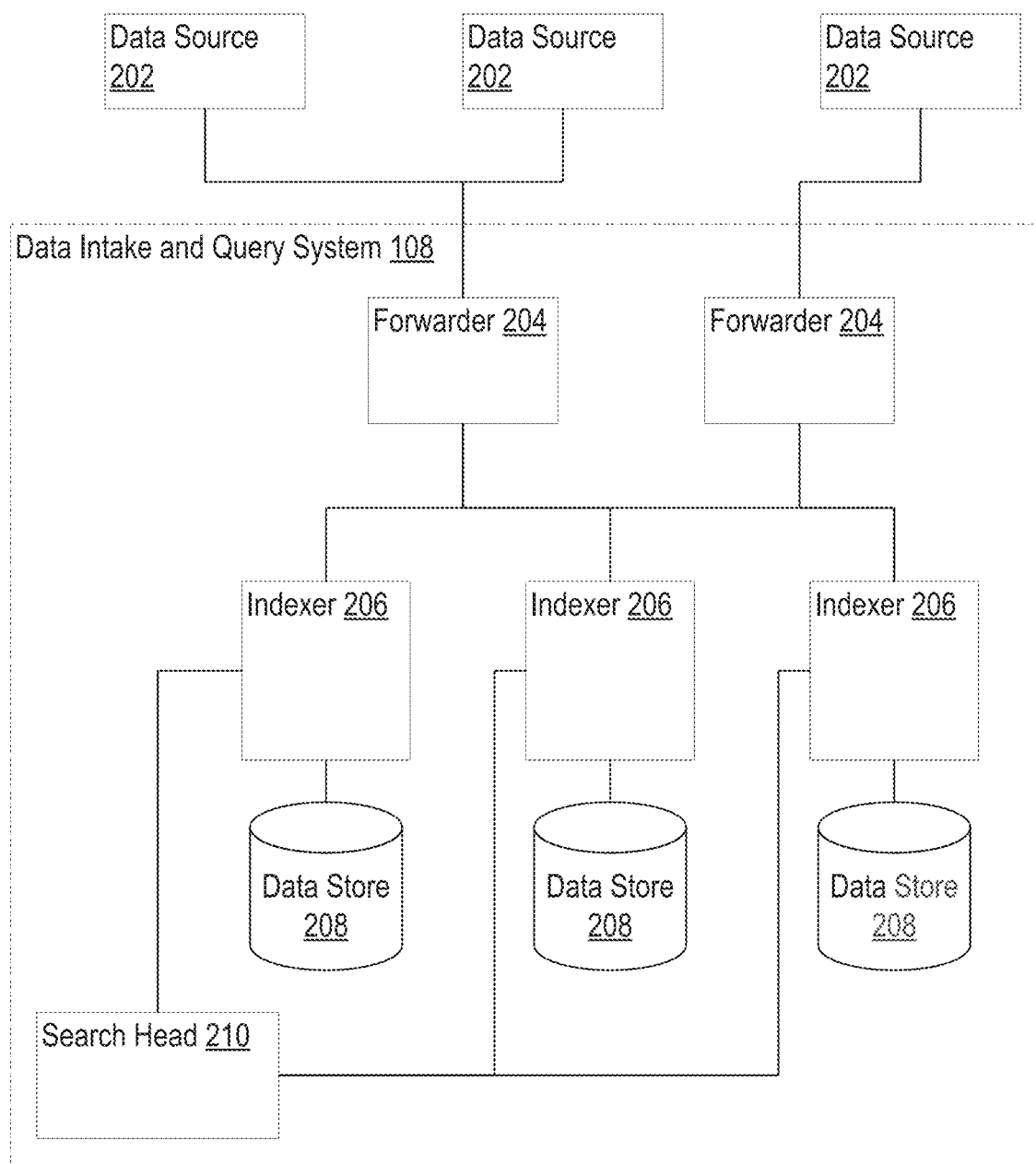
FIG. 2 illustrates a block diagram of an example data intake and query system in which an embodiment may be implemented.

FIG. 2 depicts a block diagram of an illustrative data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
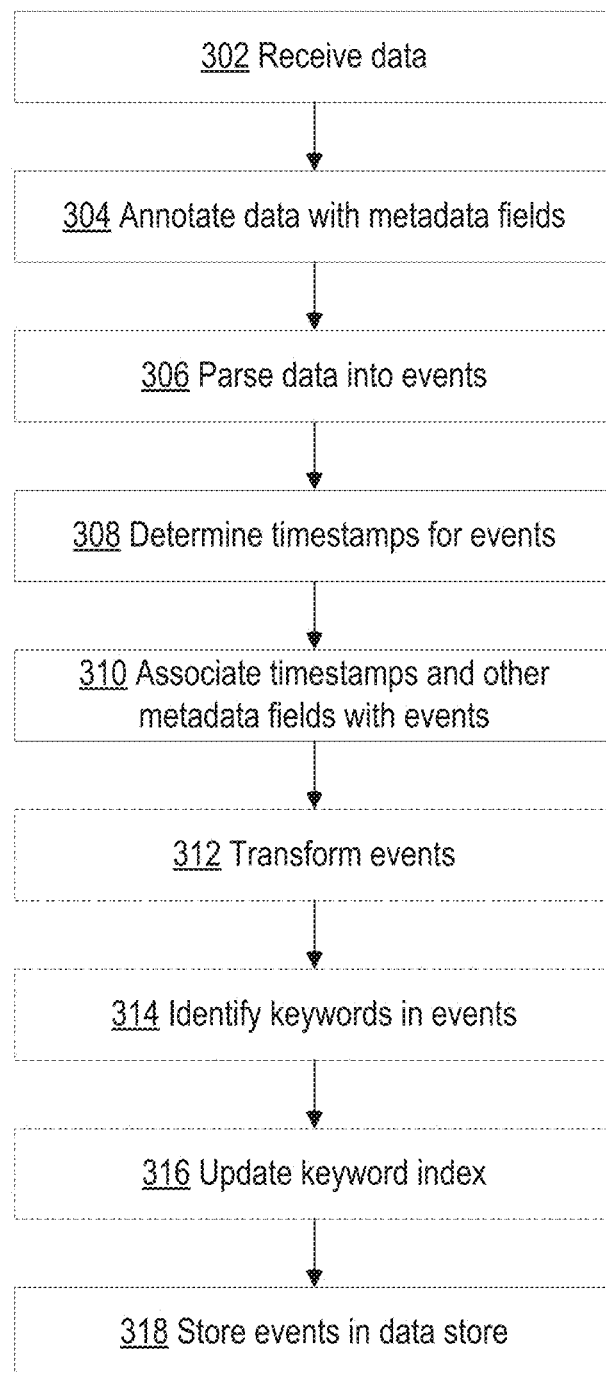
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.), When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
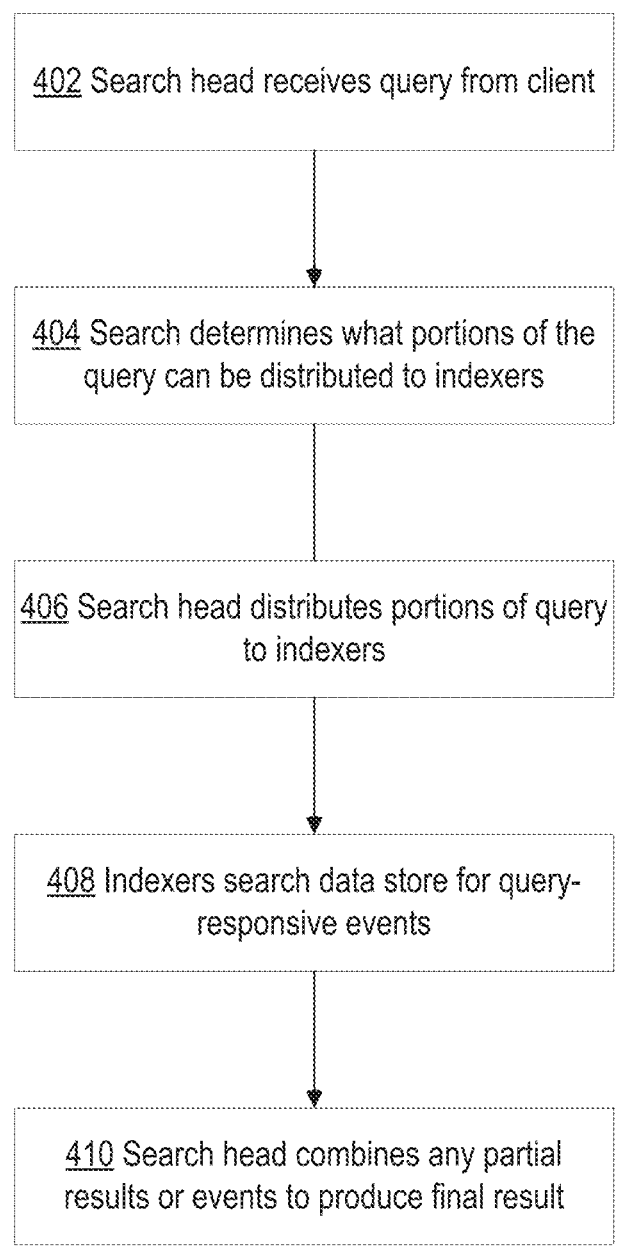
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head duster may take the place of an independent search head where each search head in the search head duster coordinates with peer search heads in the search head cluster to schedule jobs, replicate search results, update configurations, fulfill search requests, etc. In an embodiment, the search head (or each search head) communicates with a master node (also known as a duster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Held Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "I" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc. that indicate where the field begins and, optionally, ends.

2.8 Machine Learning (ML) Data Analysis Tool

The techniques introduced here include a computer-implemented tool that facilitates analysis of large amounts of data by use of ML techniques. An example of such a tool is the ML analysis tool ("the tool") 120 shown in FIG. 1, In certain embodiments, the tool 120 is implemented as a browser-based software application that executes on a computer system, which may be, but is not necessarily, the same computer system on which the data intake and query system 108 executes. The tool 120 cooperates with the data intake and query system 108 and provides a GUI that enables a user to train and apply a variety of different ML models on either prepackaged sample data or user-selected datasets. Note that while the tool 120 is shown as logically separate from the data intake and query system 108, in other embodiments the tool 120 could be an integral part of the data intake and query system 108. Notably, as described further below, the tool 120 provides active guidance to the user, to help the user choose data analysis paths that are likely to produce useful results and to avoid data analysis paths that are less likely to produce useful results.

Figure 5:
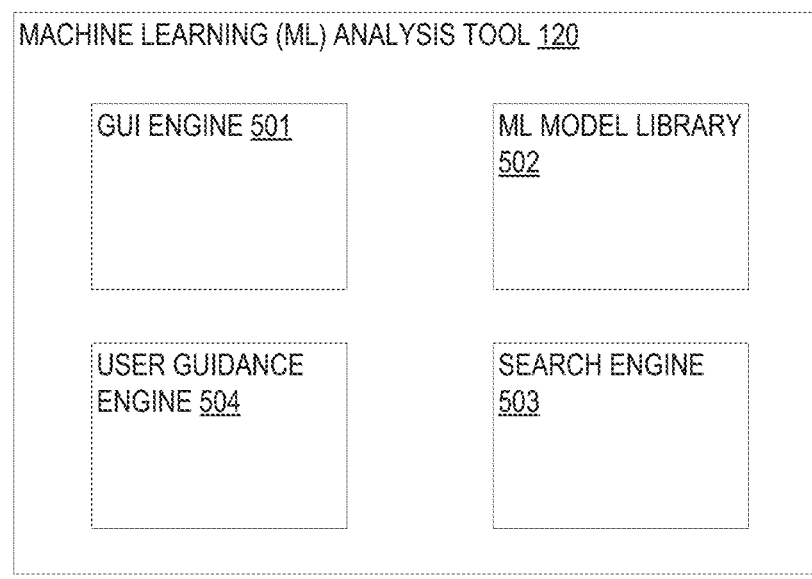
FIG. 5 is a block diagram showing an example of the functional elements of the machine learning (ML) data analytics tool ("the tool").

FIG. 5 is a block diagram showing an example of the functional elements of the tool 120. In the illustrated embodiment, the tool 120 includes several functional modules, including a GUI engine 501, an ML model library 502, a user guidance engine 503 and a search engine 504. The GUI engine 501 can include or cooperate with a browser and is responsible for generating various GUI input and output features, such as menus, user input fields, data listings (e.g., display of search results), graphical displays and other images, basic instructions for the user, etc. The ML model library 502 includes the ML model code (algorithms) that can be used to train and apply ML models. Examples of the types of ML models whose code can be included in the ML model library include: prediction of numeric fields (e.g., linear regression), prediction of categorical fields (e.g., logistic regression), detection of numeric outliers (e.g., distribution statistics), detection of categorical outliers (e.g., probabilistic statistics), forecasting time series data, and cluster identification/analysis (e.g., K-means, DBSCAN, Spectral Clustering, BIRCH). In some embodiments, the ML model library 502 is embodied at least in part as the Python Scientific library, SciPy.

The search engine 503 is complementary in function to the search head 210 of the data intake and query system 108. The search engine 503 enables a user to specify and run various SPL queries, which may be passed in at least some instances to the search head 210, for execution against data previously processed by the data intake and query system 108.

The user guidance engine 504 is responsible for generating active guidance for the user such as mentioned above, at least some of which is output via the GUI, to help the user choose useful data analysis paths. For example, once the user selects a particular type of ML model to train and a training dataset (e.g., a data file) from which to train it, the user guidance engine 504 can suggest to the user (via the GUI generated by GUI engine 501) specific data fields from the training dataset that the user can select for training the model. The user guidance engine 504 can also suggest specific data fields from the training dataset that the user can select as the output of the model.

Additionally, the user guidance engine 504 can suggest to the user various types of additional analyses that the user can request, to obtain with corresponding graphical displays, which the user can use to validate training of an ML model or the results applying a trained ML model to other data. To accomplish this, the tool can, as a background process, apply user-specified field selections and/or other user inputs to various predefined SPL query templates, to produce multiple "prepackaged" SPL analysis queries. Each of the prepackaged analysis queries is tailored to the user's selected dataset and corresponds to a different kind of data analysis. The user can then select a control on the GUI, corresponding to any of these analyses, to cause the corresponding query to be executed, which causes a corresponding visualization (e.g., a graph) of the query results to be generated. The analysis queries are "prepackaged" in the sense that they are generated without any specific user request to generate them, so that they are ready for the user to invoke if desired. Among other benefits, preparing these tailored queries prior to any request for the analyses improves performance by reducing overall latency associated with model validation.

Figure 6:
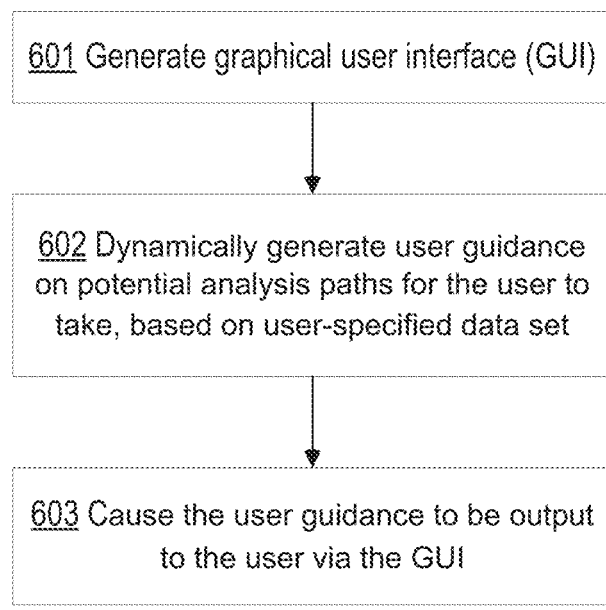
FIG. 6 shows an example of an overall process performed by the tool.

FIG. 6 shows an example of an overall process performed by the tool 120. At step 601 the tool generates the above-mentioned GUI for facilitating ML based data analysis. The tool 120 then at step 602 dynamically generates user guidance on potential data analysis paths for the user to take, based on a training dataset that the user has specified to train an ML model of a user-selected type. Then, at step 603 the tool 120 causes at least some of the above-mentioned user guidance to be output to the user via the GUI. Other aspects of the user guidance may be output to the user in other ways or formats, such as audibly.

Figure 7:
FIG. 7 is an example of an initial screen that the tool can display to the user upon activation.

FIG. 7 shows an example of a home screen 700 that the tool 120 can display to the user upon activation of the tool 120 The screen 700 a dashboard that includes labels and corresponding images representing various different types of ML analysis that the user can explore. The user can, for example, click on an image or associated label in the dashboard to explore the represented analysis that the tool 120 enables. The dashboard can provide, for each type of analysis, end-to-end examples based on sample datasets and the ability to apply the analysis to a dataset selected by the user. The user can inspect the dashboard panels and other code to see how each one works and then create custom dashboards to suit his or her needs.

Figure 8:
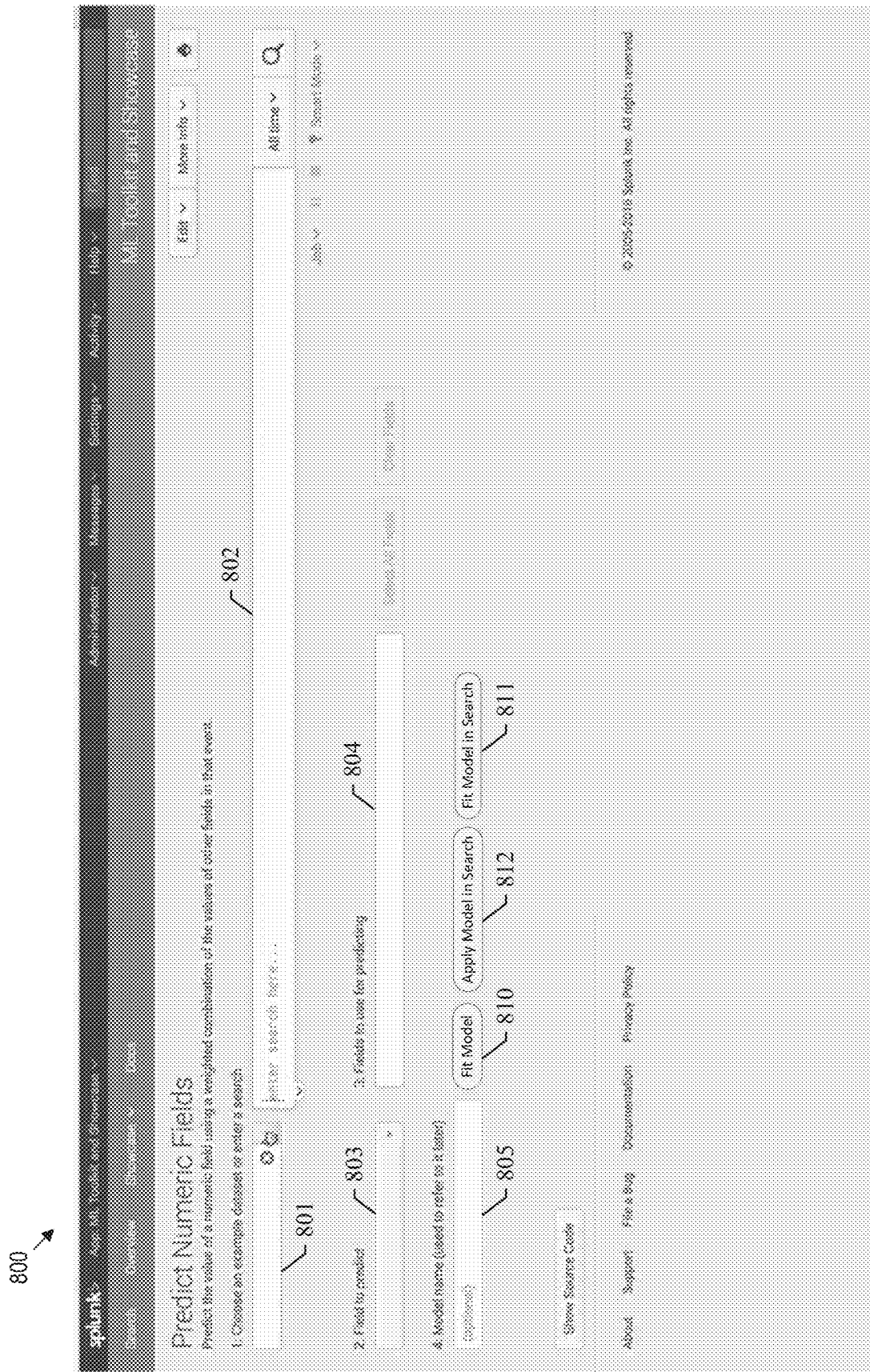
FIG. 8 shows an example of a graphical user interface (GUI) screen from which a user can train or apply an ML model.

FIG. 8 shows an example of a GUI screen from which a user can train or apply an ML model. In the illustrated example, the user has selected to train an ML model for predicting numeric fields (e.g., linear regression). The GUI screen 800 includes a pulldown menu 801 from which the user can select from among multiple example training datasets to train the model. Alternatively, the user can specify a training dataset of his or her own choosing in user input field 802 (e.g., stored data previously processed by the data intake and query system 108), by use of a simple SPL command. The GUI screen 800 further includes an input field 803 in which the user can select a data field from the training dataset (i.e., the output of the model) and a user input field 804 in which the user can select one or more data fields from the training dataset, to use for predicting (i.e., based on which to train the model). Note that the term "user input field" should not be confused with the term "data field" in this description: User input fields are regions within a GUI display (e.g., fields 801 through 804) by which the user of the tool 120 can input data to the tool 120. Data fields, on the other hand, are features (e.g., name-value tuples) in an underlying dataset, such as a training dataset or target dataset. The GUI screen 800 further includes an input field 805 in which the user can (optionally) specify a name for the model to be trained.

Figure 9:
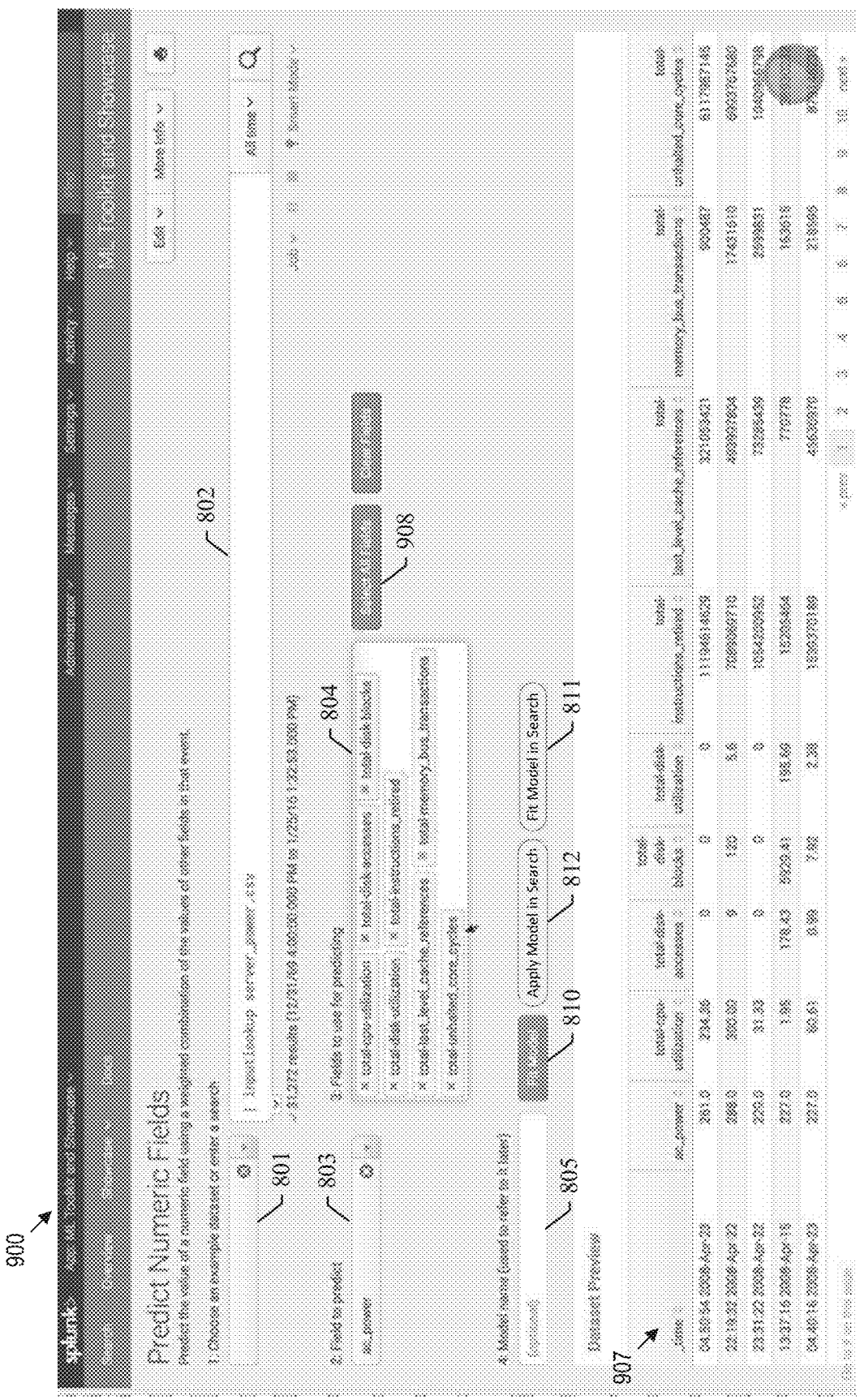
FIG. 9 shows a GUI screen related to the screen in FIG. 8, but as shown after the user has input certain data.

FIG. 9 shows another GUI screen 900 related to screen 800 in FIG. 8, but as shown after the user has input certain data. In particular, the user has input a simple "input lookup" SPL command in the query field 802 to specify a training dataset (a data file) called "server_power.csv" as the training dataset. Additionally, in user input field 803 the user has selected a numeric data field called "ac_power" as the field to predict (the output of the model). Further, in user input field 804 the user has selected multiple data fields of the training dataset to use in predicting values of "ac_power." Upon selection by the user of the required data fields, the tool 120 has caused a preview 907 of the dataset to be displayed to the user.

Notably, the tool 120 can guide the user by suggesting data fields to select, such as the model's output data field(s) (e.g., the field to predict in the present example) and/or the fields to use for training the model (e.g., for predicting in the present example). These suggestions can be displayed, for example, in response to the user clicking a pulldown button of a user input field or placing the cursor over the user input field. The user can then simply click on any displayed data field to select it, i.e., to cause it to be populated into the user input field. For example, if the user places the cursor over the user input field 804, "Fields to use for predicting," the tool 120 may display a list of suggested data fields over or next to that user input field, as illustrated in FIG. 9. The user also can easily select all known data fields of the training dataset to use for training, by clicking on button 908.

Figure 10:
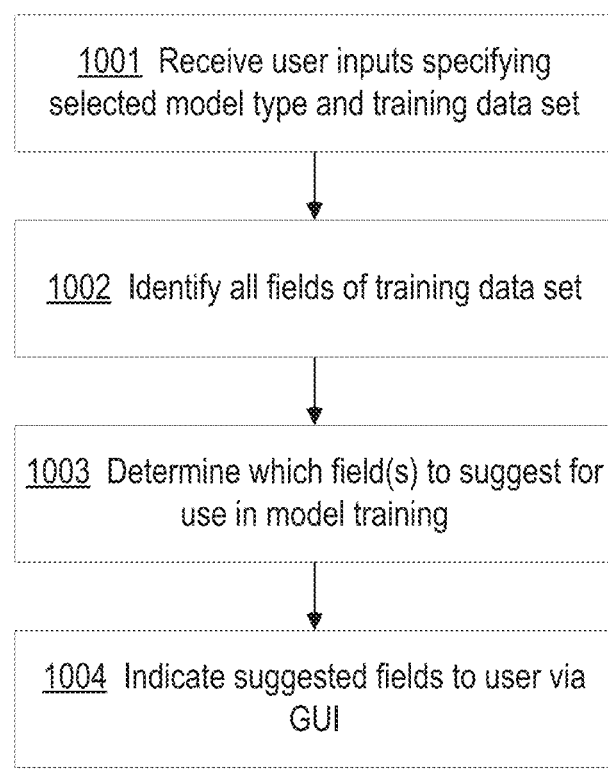
FIG. 10 shows an example process that the tool can perform to provide user guidance.

FIG. 10 shows an example process that the tool 120 can perform to provide user guidance. At step 1001, the tool 120 receives user input specifying the selected ML model type and the training dataset from which to train ("fit") the ML model. Next, at step 1002 the tool 120 identifies all of the fields of the selected training dataset. This identifying step may have been performed earlier by the data intake and query system 108 in the manner described above (e.g., see discussion of feature extraction). In such cases, the identifying step 1002 can include the tool 20 simply requesting and receiving all of the data field names and associated metadata of the specified training dataset, from the data intake and query system 108. Alternatively, the tool 120 may have the ability to identify the data fields of the specified training dataset on its own. At step 1003, the tool 120 determines which data field or fields to suggest to the user for use in training the model. Once the tool 120 determines the data field(s) to suggest, the tool 120 then indicates them to the user via the GUI, such as in the manner described above.

The techniques employed by the tool 120 for guiding the user (e.g., for suggesting data fields to select) may include, for example, heuristics and/or statistical methods. Examples of heuristics usable for this purpose include the following:

1) omitting data fields that do not contain the correct type of values (e.g., a numeric field is needed but a particular field X contains the value "Thursday").
2) suggesting data fields based on their names (e.g., "item_count" is likely to be a count of something, i.e., numeric)
3) Suggesting data fields that only have a small number of values (even if those values are numbers) as potential categorical fields.

Examples of statistical methods usable for this purpose include the following:

1) computing the variance of numeric fields, omitting fields with little or no variance and suggesting fields with interesting distributions.
2) computing the covariance of fields and omitting fields whose variance is explained by other fields already included.
3) using methods such as principal components analysis to compute new fields that efficiently explain the variance of other fields, and suggest fitting a model to those.
4) train a model on each field individually and suggest training a model with the k fields that individually are the best predictors.

The tool 120 could also apply combinations of any or all the above techniques and/or other techniques not mentioned here.

When the user is ready to train an ML model, the user simply clicks the "Fit Model" button 810 or "Fit Model in Search" button 811 (FIG. 9) to invoke the training process. This action causes the appropriate model code to be loaded from the ML library 520 and invoked with the selected data fields. The result of the training process can be in any of various forms, such as a tabular listing of values of the output field (e.g., "ac_power" in the example above) and/or a graphical plot, etc. When an ML model has been trained and is currently selected, the "Apply Model in Search button" 812 is enabled, using which the user can apply the trained model to a target dataset.

In certain embodiments, the tool 120 suggests to the user various types of additional analyses that the user can invoke to validate a trained ML model or to validate the results applying a trained ML model to a dataset. To accomplish this, the tool can, as a background process, apply user-specified field selections and/or other user inputs to various predefined query templates, to produce multiple "prepackaged" SPL queries. Each of the prepackaged queries is tailored to the user's selected training dataset and corresponds to a different kind of validation analysis. For example, if the user chose to train an ML model for predicting numeric fields, the tool 120 may, in the background, generate SPL queries that can be selected to generate an actual vs. predicted scatterplot, a residuals histogram, $R^2$ statistics, root mean square error (RMSE) value, a summary model, etc., as illustrated by example in FIG. 11.

Figure 11:
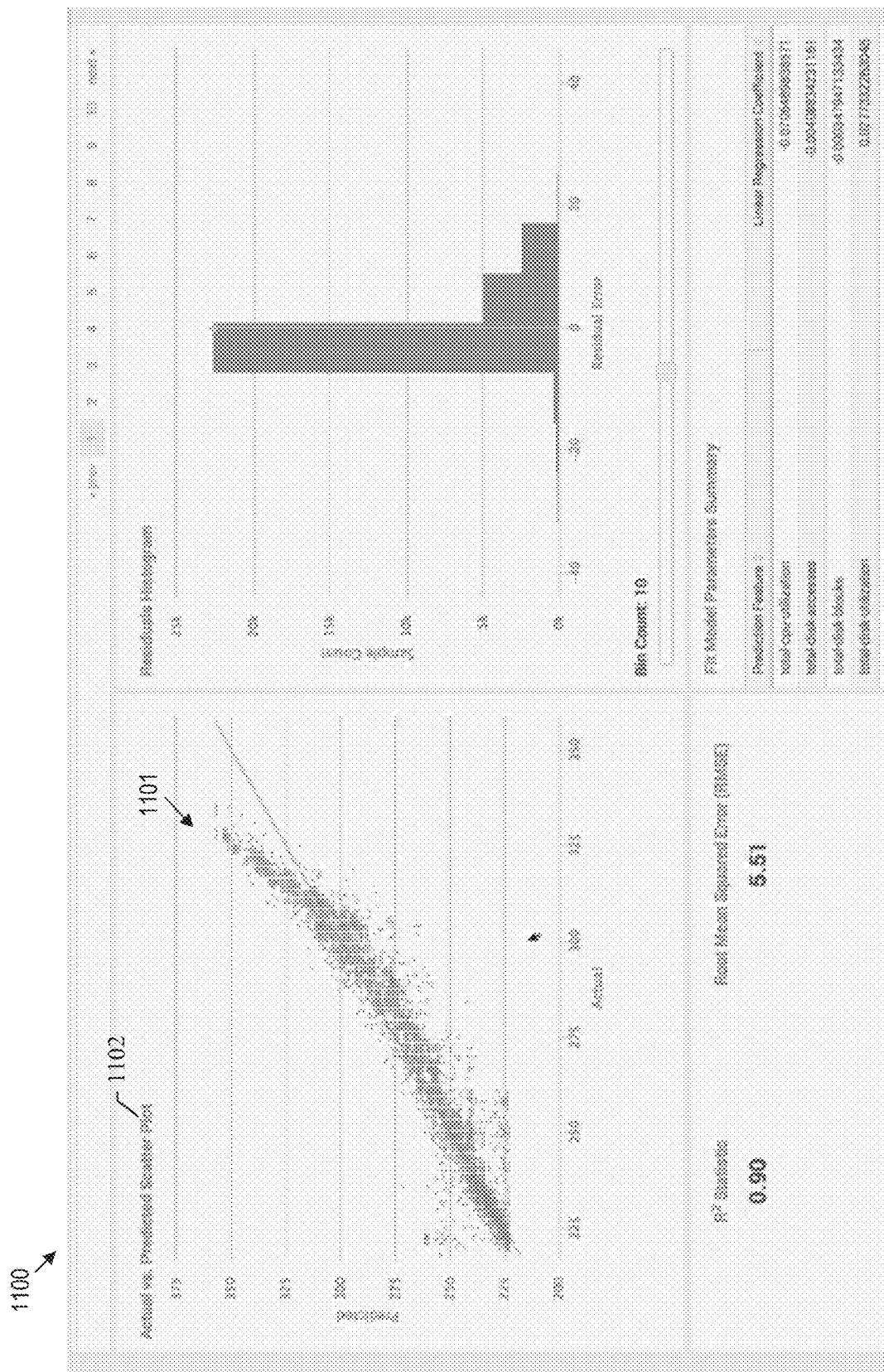
FIG. 11 shows an example of a GUI screen of the tool, including images and associated labels indicating different types of analyses that can be invoked.

FIG. 11 shows an example of a GUI screen 1100 including images and associated labels indicating to the user the various different types of analyses that can be invoked on a trained model to validate it. The example display in FIG. 11 may be provided as part of the same GUI screen as that shown in FIGS. 8 and 9 or as a separate screen. Each image 1101 and associated label 1102 in FIG. 11 can be a hyperlink associated with a separate analysis query (not shown). The user can click on an analysis hyperlink (e.g., label or image) to invoke the associated query and thereby run the corresponding analysis. The actual analysis queries may not necessarily be displayed to the user, unless the user requests that they be displayed by inputting an appropriate command. The results of running a selected analysis are then displayed on the same screen or on a new screen.

The analysis queries are "prepackaged" in the sense that they are generated as soon as the tool 120 has sufficient user input from which to do so, without any specific user request to generate them. This improves performance by reducing overall latency associated with model validation.

Figure 13:
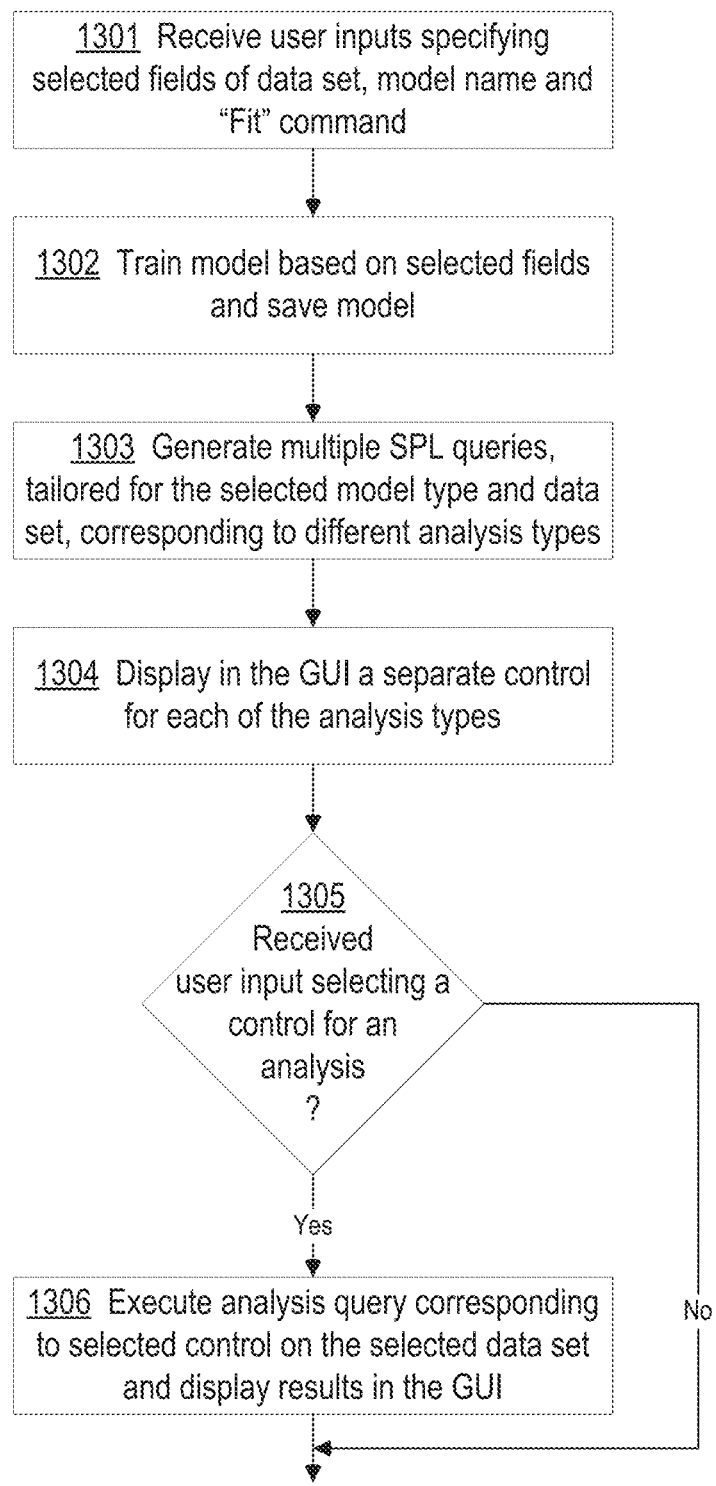
FIG. 13 shows an example of process that the tool can execute to suggest various types of analyses to the user.

In certain embodiments, the analysis queries are generated based on predefined query templates, i.e., queries that contain variables. The variables are replaced with values from user inputs, such as the filename/location of the training dataset and the user-specified data fields discussed above, to produce the final, fully populated queries. FIGS. 12A and 12B collectively show a table including examples of SPL query templates and corresponding final queries, for various types of analyses that the user can invoke, FIG. 13 shows an example of process that the tool 120 can execute to suggest various types of analyses to the user, as described above. At step 1301, the tool 120 receives user inputs (not necessarily simultaneously) specifying selected fields of the training dataset, a name for the model, and activation of the "Fit Model" (Train) button 810, In response, at step 1302 the tool 120 trains (fits) the model on the specified training dataset based on the selected fields and saves the trained model in a data store. At step 1303 the tool 120 generates multiple SPL queries, each tailored for the selected model type and training dataset, and each corresponding to a different type of analysis that can be invoked by execution of the query. For each of the analysis types, the tool 120 then displays a separate control (e.g., text or image hyperlink) in the GUI. The user can invoke any of those analyses by selecting the corresponding displayed user control, e.g., by clicking on the corresponding hyperlink. If a user input is received selecting one of those controls (step 1305), the tool 120 executes the corresponding query on the selected dataset and displays the results in the GUI.

Figure 14:
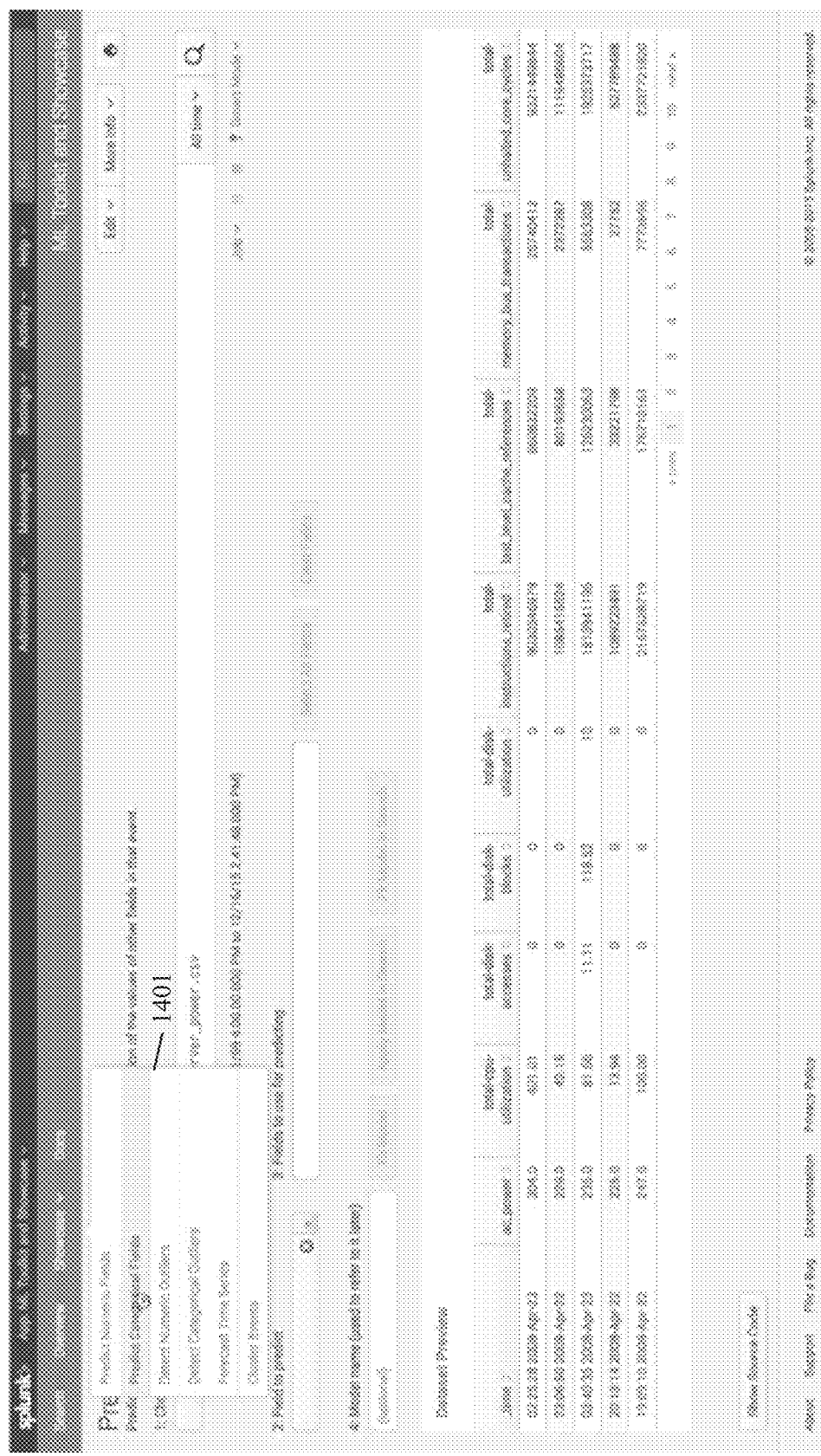
FIG. 14 shows an example of a GUI screen of the tool, including a pull-down menu for selection of an ML model type.

At any time during or after the user explores a given type of ML model, the user can select a different type of ML model to train or apply, for example, from a pulldown menu 1401 on the GUI screen associated with a given type of model, as shown in FIG. 14. Alternatively, the user can select a different type of ML model to explore by returning to the dashboard screen 700 (FIG. 7).

Figure 15:
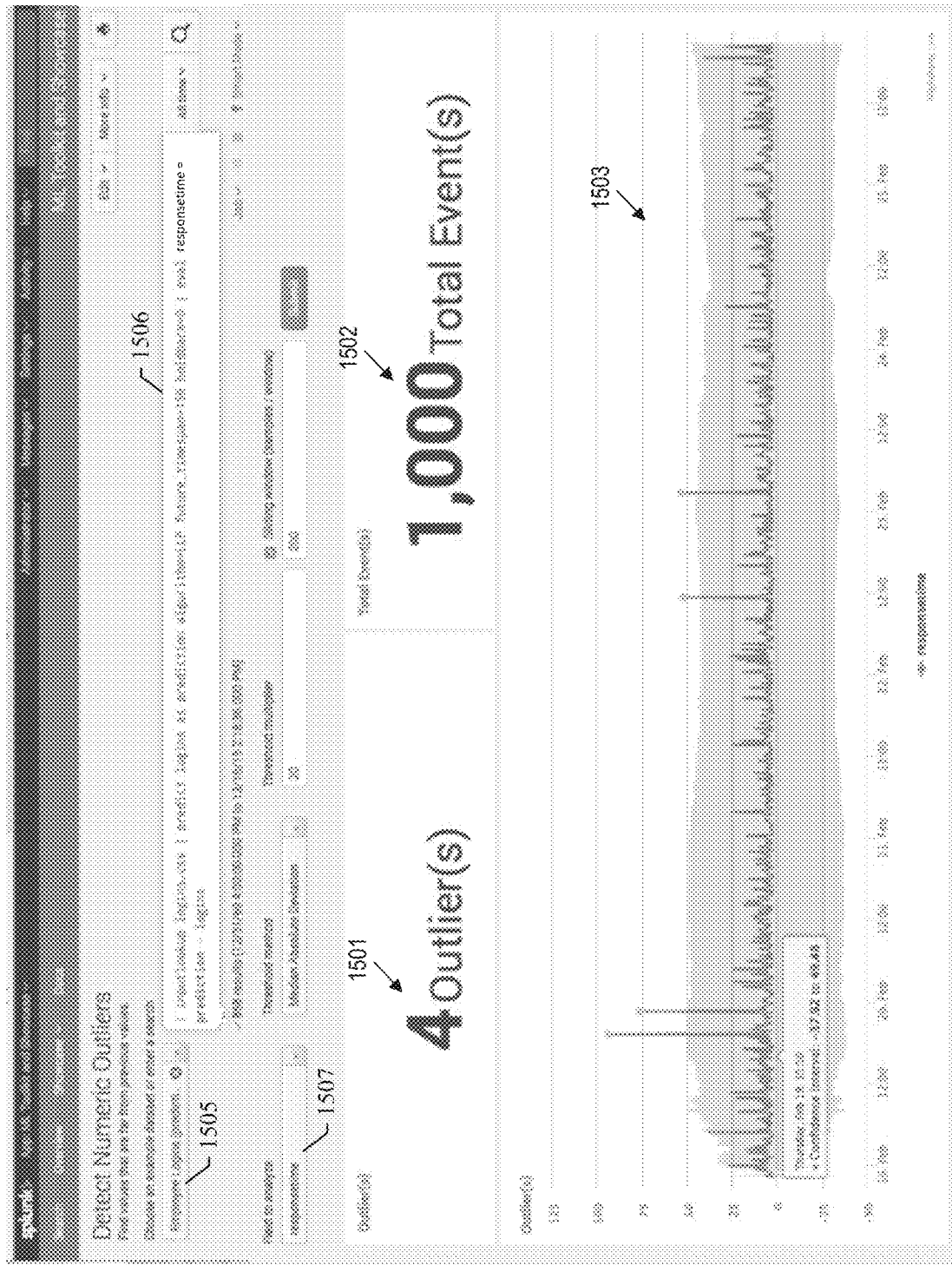
FIG. 15 shows an example of a GUI screen of the tool, from which the user can explore an ML model for detecting numeric outliers.
Figure 16:
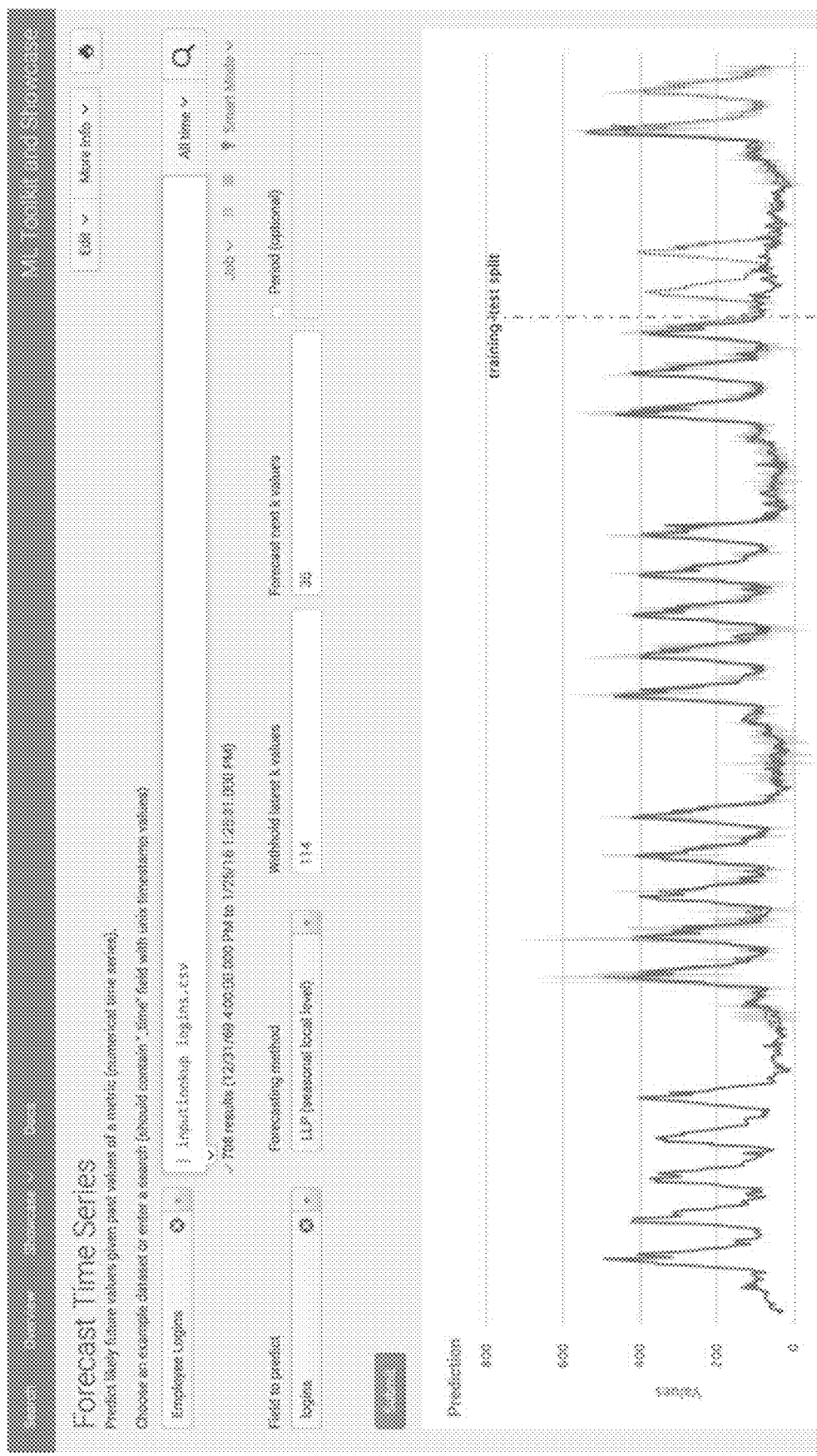
FIG. 16 shows an example of a GUI screen of the tool, from which the user can explore an ML model for forecasting time series data.

FIG. 15 shows another example of a GUI screen, from which the user can explore a different type of ML model, namely, an model for detecting numeric outliers in a dataset. More specifically, FIG. 15 shows an example of a screen that may be generated after the user has trained the Detect Numeric Outliers model on a given dataset (in this case, a dataset called "logins.csv"). As shown, the display includes a value 1501 representing the total number of outliers, a value 1502 representing the total number of data events considered, and a graphical plot 1503 of the results for the specified time period. As in the previous example (predicting numeric fields), the tool 120 includes user input fields 1505 and 1506 to allow the user to choose an example or to specify a training dataset for training, a user input field 1507 to select a data field to analyze, and other user input fields as shown. Also as in the previous example, the tool 120 can use various techniques to suggest data fields and/or other inputs to the user, as described above, FIG. 16 shows yet another example of a GUI screen that can be provided by the tool 120, and specifically, a screen from which a user can explore an ML model for forecasting time series data. Many other types of ML models/analysis types and graphical displays can be provided by a tool such as described herein, any or all of which may provide guidance to the user in the manner described above.

Figure 17:
FIG. 17 shows an example of a GUI screen of the tool, displaying a search query.
Figure 18:
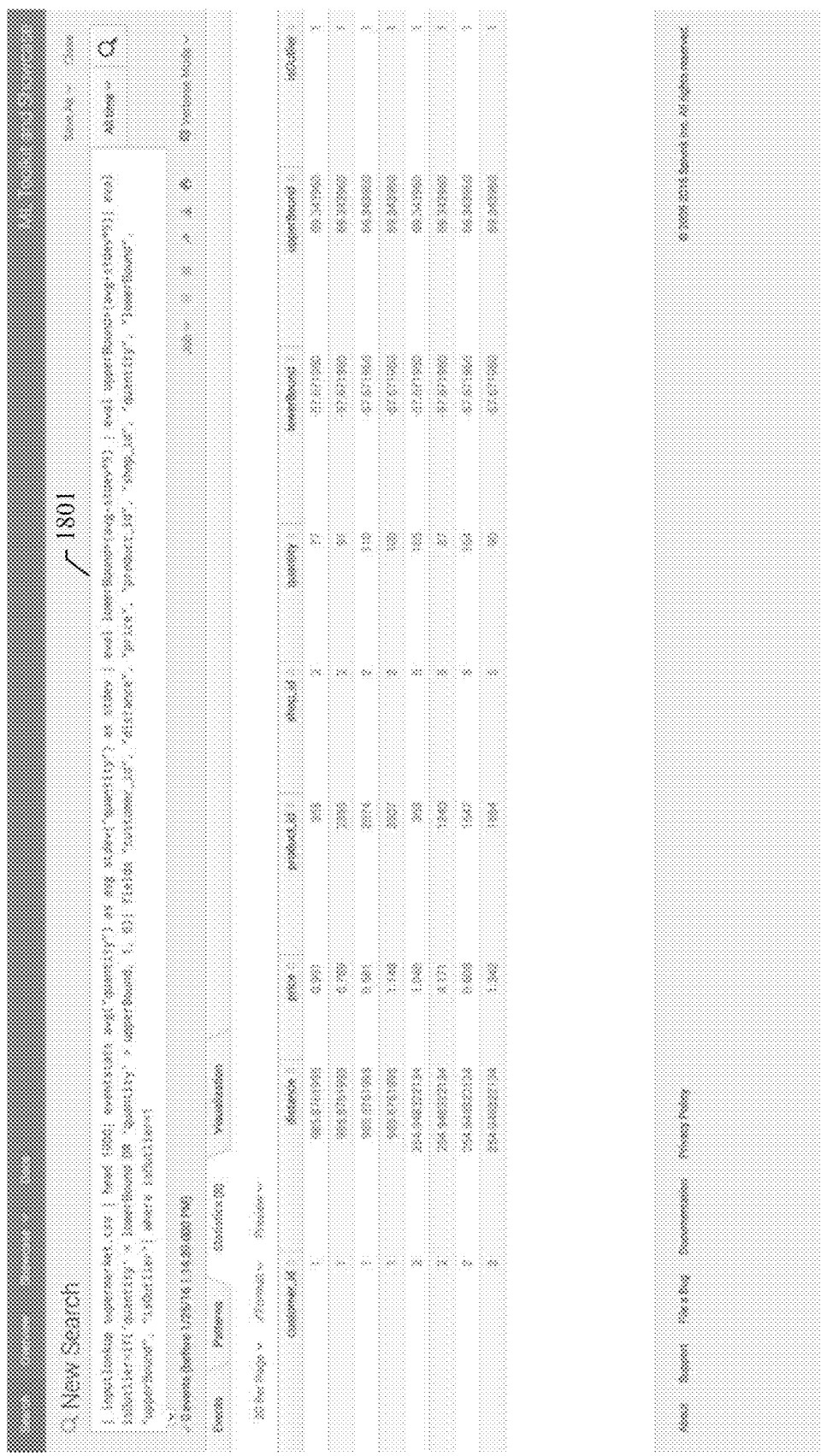
FIG. 18 shows an example of a GUI screen of the tool, displaying a user input field to receive user inputs representing a search query.

When the user inputs a command (e.g., presses a button) to fit (train) or apply an ML model, the tool 120 automatically generates an SPL search query based on the user inputs, to be executed against the user-specified training dataset or target dataset. The query may be displayed to the user, as illustrated by example as commented SPL query 1701 in FIG. 17, to enable the user to better understand the effects of the user's selections and to enable the user to edit those selections. As shown in FIG. 18, the GUI can also provide a user input field 1801 in which the user can specify a new SPL search query to be executed against stored data, the results of which can be displayed in a table, graph or other format. To execute the search query, the search engine 503 of the tool 120 may pass the query to the search head 210 of the data intake and query system 108, for execution against stored data previously processed by the data intake and query system 108. Alternatively, or additionally, the search engine of the tool 120 may have the ability to execute the query directly against stored data, i.e., without passing the query off to the search head 210.

Figure 19:
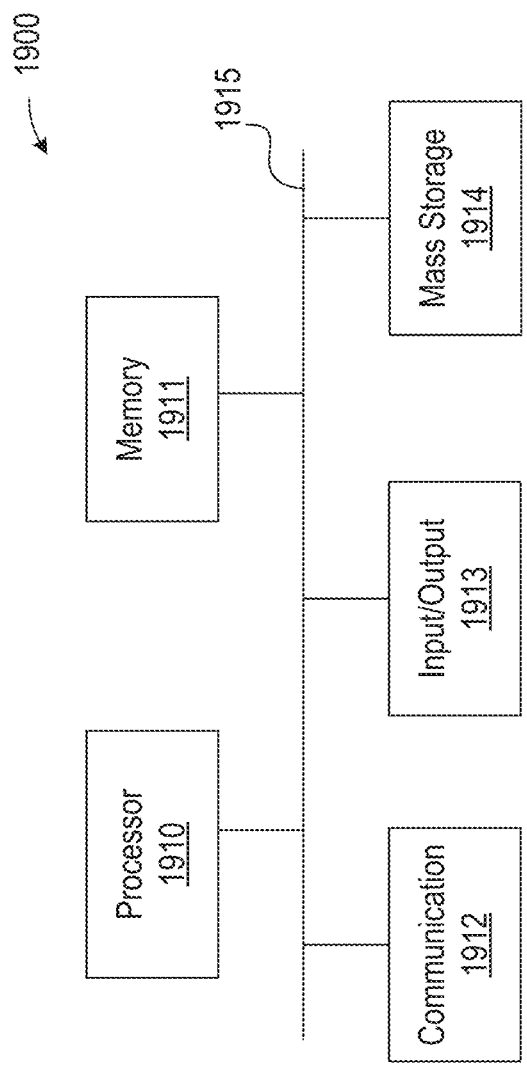
FIG. 19 shows a high-level example of a hardware architecture of a processing system that can be used to implement any one or more of the functional components described herein.

FIG. 19 shows a high-level example of a hardware architecture of a processing system that can be used to implement any one or more of the functional components referred to above (e.g., the tool, forwarders, indexer, search head, data store). One or multiple instances of an architecture such as shown in FIG. 9 (e.g., multiple computers) can be used to implement the techniques described herein, where multiple such instances can be coupled to each other via one or more networks.

The illustrated processing system 1900 includes one or more processors 1910, one or more memories 1911, one or more communication device(s) 912, one or more input/output (I/O) devices 1913, and one or more mass storage devices 1914, all coupled to each other through an interconnect 1915. The interconnect 1915 may be or include one or more conductive traces, buses, point-to-point connections, controllers, adapters and/or other conventional connection devices. Each processor 1910 controls, at least in part, the overall operation of the processing device 1900 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 1911 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 1914 can be or include one or more hard drives, digital versatile disks (DVDs), flash memories, or the like. Each memory 1911 and/or mass storage 1914 can store (individually or collectively) data and instructions that configure the processor(s) 1910 to execute operations to implement the techniques described above. Each communication device 1912 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 1900, each I/O device 1913 can be or include a device such as a display (which may be a touch screen display), audio speaker, keyboard, mouse or other pointing device, microphone, camera, etc, Note, however, that such I/O devices may be unnecessary if the processing device 1900 is embodied solely as a server computer.

In the case of a user device, a communication devices 1912 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication devices 1912 can be or include, for example, any of the aforementioned types of communication devices, a wired Ethernet adapter, cable modem, DSL modem, or the like, or a combination of such devices.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of enabling validation of a machine learning model for data search and analysis, the method comprising:
    receiving, by a computer system, first user input specifying a selected training dataset and parameters for training a selected machine learning model for data search and analysis, the parameters including one or more data fields;
    training, by the computer system, the selected machine learning model on the selected training dataset based on the parameters including the one or more data fields;
    generating, by the computer system, a plurality of queries, in a pipelined search language, that are executable against stored data without having received any user request to generate any of the queries and prior to receiving a user request for validation analysis of the selected machine learning model, each of the queries being generated based on a separate stored query template and being customized to the selected training dataset by the computer system replacing one or more variables in the stored query template with a corresponding one or more user-specified values, the one or more user-pecified values including the one or more data fields, each of the queries capable of being executed against the selected training dataset, wherein each of the queries is designed to produce a different one of a plurality of different validation analyses that can be invoked on the stored data to allow validation of the selected machine learning model, and wherein the queries are generated without any user request to generate the queries;
    causing, by the computer system, display of a separate user control for each of the plurality of different validation analyses;
    receiving, by the computer system, second user input selecting one of the controls for a selected validation analysis of the plurality of different validation analyses;
    executing, by the computer system, a query of the plurality of queries, designed to produce the selected validation analysis of the plurality of different validation analyses, on the stored data in response to the second user input; and
    causing, by the computer system, display of a result of executing the query to allow validation by a user of the selected machine learning model.

2. The method of claim 1, wherein the selected training dataset comprises timestamped machine data events.

3. The method of claim 1, wherein the parameters for training a machine learning model comprise a user-selected field of the selected dataset.

4. The method of claim 1, wherein generating the plurality of queries comprises causing each of the queries to be displayed with explanatory comments.

5. The method of claim 1, causing display of a user input field in which a user can specify a new search query to be executed against the stored data.

6. The method of claim 1, wherein each of the queries is generated based on a different one of a plurality of stored query templates.

7. The method of claim 1, wherein each of the queries is generated based on a different one of a plurality of stored query templates, and wherein each of the query templates comprises a query that contains a variable.

8. The method of claim 1, further comprising:
    generating an indication to a user of a suggested data field of the selected training dataset upon which to base training of the machine learning model.

9. The method of claim 1, further comprising providing a plurality of user input fields to receive user inputs that specify particular data fields of the selected training dataset, for training the selected machine learning model.

10. The method of claim 1, further comprising:
    providing a plurality of user input fields to receive user inputs that specify particular data fields for applying the selected machine learning model.

11. The method of claim 1, wherein the method comprises providing an indication to a user of a plurality of selectable machine learning models and enables the user to select the machine learning model to be trained from among the plurality of selectable machine learning models.

12. The method of claim 1, wherein the method comprises enabling a user to view data indicative of the trained machine learning model.

13. The method of claim 1, wherein the selected training dataset comprises a plurality of data fields, the method further comprising:
    identifying a subset of the data fields in the selected training dataset as satisfying a predetermined criterion for relevance to the selected machine learning model.

14. The method of claim 1, further comprising:
    providing a user input field for receiving user input that specifies a particular data field of the selected training dataset, based on which the machine learning model is to be trained;
    identifying a subset of data fields in the selected training dataset as satisfying a predetermined criterion for relevance to the machine learning model; and
    suggesting to the user the identified subset of the data fields of the selected training dataset, for possible selection by the user in the user input field.

15. The method of claim 1, further comprising:
    providing a user input field for receiving user input that specifies at least one of:

a particular data field of the selected training dataset, based on which the selected machine learning model is to be trained; or a particular data field of a second dataset, for applying the selected machine learning model; and suggesting to the user a subset of data fields of the selected training dataset or a subset of the data fields of the second dataset, for possible selection by the user in the user input fields.

16. The method of claim 1, wherein the selected training dataset comprises a plurality of data fields, the method further comprising:

identifying a subset of the data fields in the selected training dataset as satisfying a predetermined criterion for relevance to the selected machine learning model;

providing a plurality of user input fields to receive user input specifying fields to use in training the machine learning model; and indicating to the user the subset of the data fields in the selected training dataset identified as satisfying the predetermined criterion for relevance, in relation to at least one of the user input fields.

17. The method of claim 1, wherein the selected training dataset includes a plurality of data fields, each having one or more corresponding data values;

the method further comprising:

applying a transformation to data values of a plurality of data fields of the selected training dataset, to produce new data values;

training the selected machine learning model based on the transformed data values; and identifying a data field to suggest to the user, for possible selection by the user, based on a result of the training the selected machine learning model in relation to a predetermined quality criterion.

18. A computer system comprising:

a communication device through which to communicate on a computer network; and at least one processor operatively coupled to the communication device and configured to execute operations to enable validation of a machine learning model for data search and analysis, the operations including receiving first user input specifying a selected training dataset and parameters for training a selected machine learning model for data search and analysis, the parameters including one or more data fields;

training the selected machine learning model on the selected training dataset based on the parameters;

generating a plurality of queries, in a pipelined search language, that are executable against stored data without having received any user request to generate any of the queries and prior to receiving a user request for validation analysis of the selected machine learning model, each of is the queries being generated based on a separate stored query template and being customized to the selected training dataset by the computer system replacing one or more variables in the stored query template with a corresponding one or more user-specified values, the one or more user-specified values including one or more data fields, each of the queries capable of being executed against the selected training dataset, and wherein each of the queries is designed to produce a different one of a plurality of different validation analyses that can be invoked on the stored data to allow validation of the selected machine learning model, and wherein the queries are generated without any user request to generate the queries;

causing display of a separate user control for each of the plurality of different validation analyses;

receiving second user input selecting one of the controls for a selected one of the plurality of different validation analyses; and executing a query of the plurality of queries, designed to produce the selected one of the plurality of different validation analyses, on the stored data in response to the second user input; and causing, display of a result of executing the query to allow validation by a user of the selected machine learning model.

19. A non-transitory machine-readable storage medium storing instructions, execution of which in a processing system causes the processing system to perform operations to enable validation of a machine learning model for data search and analysis, the operations comprising:

receiving first user input specifying a selected training dataset and parameters for training a selected machine learning model for data search and analysis, the parameters including one or more data fields;

training the selected machine learning model on the selected training dataset based on the parameters;

generating a plurality of queries, in a pipelined search language, that are executable against stored data without having received any user request to generate any of the queries and prior to receiving a user request for validation analysis of the selected machine learning model, each of the queries being generated based on a separate stored query template and being customized to the selected training dataset by the processing system replacing one or more variables in the stored query template with a corresponding one or more user-specified values, the one of more user-specified values including the one or more data fields, each of the queries capable of being executed against the selected training dataset, and wherein each of the queries is designed to produce a different one of a plurality of different validation analyses that can be invoked on stored data to allow validation of the selected machine learning model, and wherein the queries are generated without any user request to generate the queries;

causing display of a separate user control for each of the plurality of different validation analyses;

receiving second user input selecting one of the controls for a selected one of the plurality of different validation analyses; and executing a query of the plurality of queries, designed to produce the selected one of the plurality of different validation analyses, on the stored data in response to the second user input; and causing, display of a result of executing the query to allow validation by a user of the selected machine learning model.

* * * * *